United States Patent
Lohmeyer (10) Patent No.: US 11,897,509 B2
(45) Date of Patent: Feb. 13, 2024

(54) THERMAL MODEL FOR PREVENTING COMPONENT OVERHEATING

(71) Applicant: GM Cruise Holdings LLC, San Francisco, CA (US)

(72) Inventor: James B. Lohmeyer, Berkeley, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 184 days.

(21) Appl. No.: 17/361,585

(22) Filed: Jun. 29, 2021

(65) Prior Publication Data

US 2022/0410935 A1    Dec. 29, 2022

(51) Int. Cl.
*B60W 30/06*    (2006.01)
*B60W 60/00*    (2020.01)
*G01W 1/04*    (2006.01)

(52) U.S. Cl.
CPC ........ *B60W 60/0016* (2020.02); *B60W 30/06* (2013.01); *G01W 1/04* (2013.01); *B60W 2420/42* (2013.01); *B60W 2420/52* (2013.01); *B60W 2555/20* (2020.02); *G05D 2201/0213* (2013.01)

(58) Field of Classification Search
CPC ............ B60W 60/0016; B60W 30/06; B60W 2555/20; B60W 2420/42; B60W 2420/52; G01W 1/04; G05D 2201/0213
See application file for complete search history.

(56) References Cited

U.S. PATENT DOCUMENTS

2019/0080602 A1*  3/2019  Rice .................... B60H 1/00878
2019/0315232 A1*  10/2019  Ing ........................... B60L 58/26

FOREIGN PATENT DOCUMENTS

CN    111833479 A  * 10/2020 ............. G07C 5/006

* cited by examiner

*Primary Examiner* — Vivek D Koppikar
*Assistant Examiner* — Jeffrey R Chalhoub
(74) *Attorney, Agent, or Firm* — Novak Druce Carroll LLP (57) ABSTRACT

A computer-implemented method may include receiving, by a computing system on an autonomous vehicle, local weather data and routing data of the autonomous vehicle, the autonomous vehicle including a sensor platform mounted on the autonomous vehicle. The method may include based on the local weather data and the routing data, predicting, by the computing system using a thermal model, a thermal loading and a temperature of a component(s) of a sensor platform at one or more future times, the thermal loading and the temperature being during an operation of the autonomous vehicle. The method may include sending an overheating warning to a controller of the autonomous vehicle based on a determination that the thermal loading or the temperature of the component(s) exceeds a threshold. The method may include reporting a degraded state of the autonomous vehicle to park prior to a predicted overheating of the component(s).

20 Claims, 6 Drawing Sheets

THERMAL MODEL FOR PREVENTING COMPONENT OVERHEATING

TECHNICAL FIELD

The disclosure generally relates to autonomous vehicles and, more specifically, predicting overheating of sensors and computing components of autonomous vehicles.

BACKGROUND

An autonomous vehicle is a motorized vehicle that can navigate without a human driver. An example autonomous vehicle includes a plurality of sensor systems, such as, but not limited to, a camera sensor system, a Light Detection and Ranging (LiDAR) sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

An autonomous vehicle includes radar sensors, LiDAR sensors, cameras, among others. The sensors are often housed in sensor platforms, which are configured to house various components including sensors and/or electronic components, which are packed in a small space. The autonomous vehicle and the various sensors and computing components of the autonomous vehicle may generate heat. It is challenging to keep the sensors and computing components of the autonomous vehicle from overheating or melting, particularly in warmer environments.

BRIEF SUMMARY

In one aspect, a computer-implemented method may include receiving, by a computing system on an autonomous vehicle, local weather data and routing data of the autonomous vehicle, the autonomous vehicle including a sensor platform mounted on the autonomous vehicle. The method may also include based on the local weather data and the routing data, predicting, by the computing system using a thermal model, a thermal loading and a temperature of at least one component of a sensor platform at one or more future times, the thermal loading and the temperature being during an operation of the autonomous vehicle. The method may further include sending an overheating warning to a controller of the autonomous vehicle based on a determination that the thermal loading or the temperature of the at least one component exceeds a threshold. The method may further include reporting a degraded state of the autonomous vehicle prior to a predicted overheating of the at least one component.

In another aspect, a system is provided for an autonomous vehicle. The system may include one or more processors. The system may also include at least one computer-readable storage medium having stored therein instructions which, when executed by the one or more processors, cause the system to receive, by a computing system on an autonomous vehicle, local weather data and routing data of the autonomous vehicle, the autonomous vehicle including a sensor platform mounted on the autonomous vehicle. The at least one computer-readable storage medium having stored therein instructions which, when executed by the one or more processors, cause the system to based on the local weather data and the routing data, predict, by the computing system using a thermal model, a thermal loading and a temperature of at least one component of a sensor platform at one or more future times, the thermal loading and the temperature being during an operation of the autonomous vehicle. The at least one computer-readable storage medium having stored therein instructions which, when executed by the one or more processors, cause the system to send an overheating warning to a controller of the autonomous vehicle based on a determination that the thermal loading or the temperature of the at least one component exceeds a threshold. The at least one computer-readable storage medium having stored therein instructions which, when executed by the one or more processors, cause the system to report a degraded state of the autonomous vehicle prior to a predicted overheating of the at least one component.

In a further aspect, a non-transitory computer readable medium may include instructions, the instructions, when executed by a computing system on an autonomous vehicle, cause the computing system to receive, by a computing system on an autonomous vehicle, local weather data and routing data of the autonomous vehicle, the autonomous vehicle including a sensor platform mounted on the autonomous vehicle. The instructions, when executed by a computing system on an autonomous vehicle, cause the computing system to based on the local weather data and the routing data, predict, by the computing system using a thermal model, a thermal loading and a temperature of at least one component of a sensor platform at one or more future times, the thermal loading and the temperature being during an operation of the autonomous vehicle. The instructions, when executed by a computing system on an autonomous vehicle, cause the computing system to send an overheating warning to a controller of the autonomous vehicle based on a determination that the thermal loading or the temperature of the at least one component exceeds a threshold. The instructions, when executed by a computing system on an autonomous vehicle, cause the computing system to report a degraded state of the autonomous vehicle prior to a predicted overheating of the at least one component.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

An autonomous vehicle includes various sensors and computing components to assist with various operations of the autonomous vehicle. Non-limiting examples of sensors that can be implemented by an autonomous vehicle include radar sensors, LiDAR sensors, image sensors, inertial measurement units (IMUs), audio sensors, depth sensors, among others. In some examples, the sensors can be housed in one or more sensor platforms. A sensor platform can house various components such as sensors and/or other electronic components. In some cases, the sensors and/or other electronic components in the sensor platform may be packed in a small space, which can negatively impact air flow and heat dissipation, as well as other thermal management conditions. The autonomous vehicle and the various sensors and computing components of the autonomous vehicle may also generate heat. Moreover, thermal management and maintaining the sensors and computing components of the autonomous vehicle from overheating or melting can be very challenging, particularly in warmer environments, in direct sunlight, and/or lack of airflow (e.g., a vehicle stopped at a red light on a day with no wind). As a result, there is a concern that the sensors and computing components on the autonomous vehicle may overheat during operation.

In some cases, the increase in temperature and/or overheating of sensors and other computing components may impact the operation of the autonomous vehicle and even cause a shutdown of the autonomous vehicle. For example, overheating sensors and/or other computing components may cause a degraded state of the autonomous vehicle in a middle of a road or at a stoplight, which may cause traffic jam. In some examples, a degraded state can include a mode of operation that constrains the operational domain of the autonomous vehicle to mitigate detected risks. In some cases, there can be various levels of degraded states. In some cases, a level of degraded state can prompt the autonomous vehicle to search for a place to pull over. For example, the degraded state of the vehicle may include a shutdown. In response to such degraded state, the vehicle may stop in the middle of the road and cause traffic issues. Other levels of degraded states are also possible, as further described herein.

In some examples, the degraded state may include a partial loss of power and/or control. In the degraded state, the vehicle may still be able to pull over to stop with the sensors overheated. For example, if sensors are overheated and/or the main computer lost power, the vehicle may include redundant systems onboard that would try to safely bring the vehicle to a stop such that the vehicle may remain operational.

Systems, apparatuses, methods (also referred to as processes), and computer-readable media (collectively referred to herein as "systems and techniques") are described herein for thermal management of sensors and/or other electrical components in an autonomous vehicle. In some examples, the systems and techniques described herein provide a thermal model that can predict the temperature rise of components in real time (or near real time), such as sensors and/or other electrical components in a sensor platform. The thermal model may take into account various types of data and conditions such as, for example and without limitation, local weather data, environmental conditions (e.g., light, external sources of heat, air flow conditions, etc.), routing data (e.g., driving path, driving speeds, driving distance, driving times, probable stopping times at intersections, etc.) of the autonomous vehicle, vehicle characteristics, etc., to predict temperature conditions of sensors and/or other electrical components and/or predict when the autonomous vehicle may be nearing a thermal shutdown event. For example, the routing data can provide information about when the autonomous vehicle would stop at a stoplight, the trajectory of the autonomous vehicle, etc., which the thermal model can use when predicting temperature conditions and/or thermal shutdown events.

The thermal model can allow the prediction of temperature conditions and/or thermal shutdown events in real time. The thermal model can run efficiently in a computing system on the autonomous vehicle.

Based upon the prediction (which can be in real time or near real time) from the thermal model, the autonomous vehicle can avoid a shutdown or proactively plan for and/or react to a shutdown. For example, to prevent a shutdown and/or prevent a shutdown during operation and/or at an inconvenient location (e.g., in a middle of the road, at a stoplight, in a highway, etc.), the autonomous vehicle can stop at a selected location prior to a shutdown event based on information from the thermal model indicating a potential future shutdown event and/or a threshold increase in a temperature of one or more sensors and/or other electrical components. Using the information from the thermal model, the autonomous vehicle may be able to find a spot to pull over and park (e.g., on the side of the road, on a parking spot, in a garage, etc.) before being forced to stop because of a shutdown event. In some examples, when the autonomous vehicle parks before a shutdown event, passengers in the autonomous vehicle can get a backup vehicle (e.g., human driven vehicle or another autonomous vehicle) or wait for thermal conditions of the sensors and/or other electrical components to improve.

Figure 1:
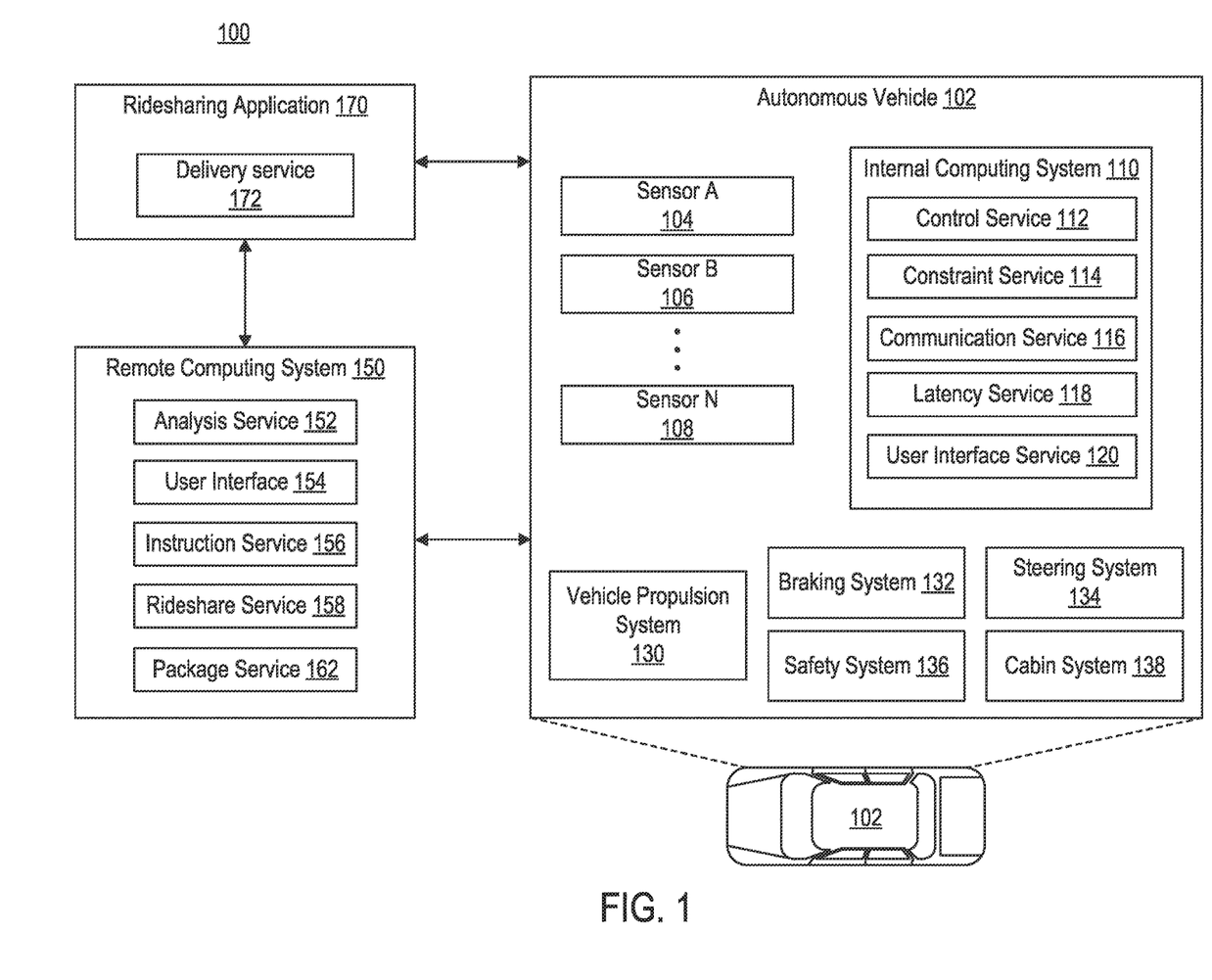
FIG. 1 illustrates an example environment that includes an autonomous vehicle in communication with a remote computing system, in accordance with some aspects of the disclosure.

FIG. 1 illustrates environment 100 that includes an autonomous vehicle 102 in communication with a computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 102 through an Nth sensor system 104). The sensor systems 104-106 are of different types and are arranged about the autonomous vehicle 102. In some cases, the same type of sensor may be used more than once per sensor platform or sensor POD, and each of the same type of sensor in a sensor platform or POD may be pointed in a different direction(s). In some examples, the first sensor system 104 may be a camera sensor system and the Nth sensor system 106 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the mechanical systems 130, 132, 134. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 206, the braking system 208, the steering system 210, the safety system 136, and the cabin system 138. The control service 112 receives sensor signals from the sensor systems 202A-D as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remoting computing system or a human operator via the remote computing system 150, software service updates, ridesharing pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 (including delivery service 172) operating on (potential) passenger computing devices. The rideshare service 158 and/or the package service 162 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

Figure 2A:
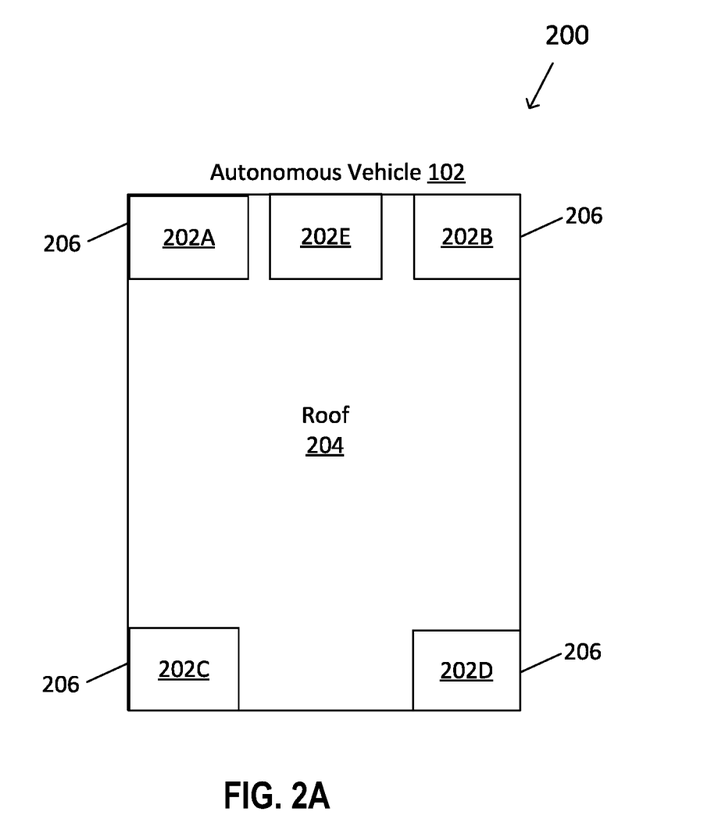
FIG. 2A shows example sensor platforms mounted on a roof of an autonomous vehicle, in accordance with some aspects of the disclosure.

FIG. 2A shows an example configuration 200 of sensor platforms mounted on a roof of an autonomous vehicle, in accordance with some examples of the disclosure. In this example, an autonomous vehicle 102 includes sensor platforms 202A-D, with one sensor platform 202E near the center of the front of the autonomous vehicle near or on a roof 204, and four sensor platforms in the four corners 206 of the autonomous vehicle near or on the roof 204. The number and locations of the sensor platforms 202A-D shown in FIG. 2A are merely illustrative examples provided for explanation purposes. It will be appreciated by those skilled in the art that the number of sensor platforms and the locations of the sensor platforms may vary.

The sensor platforms 202A-D can each include one or more sensors and/or other electrical components such as, for example and without limitation, one or more image sensors, humidity sensors, temperature sensors, pressure sensors, radars, Light Detection and Ranging (LiDAR) devices, inertial measurement units (IMUs), audio sensors, depth sensors, memory, processors, power components, and/or any other suitable electronic components. In some examples, the number and/or type of sensors and/or other electrical components in the sensor platforms 202A-D can be the same. In other examples, some or all of the sensor platforms 202A-D can include different numbers and/or types of sensors and/or other electrical components.

Figure 2B:
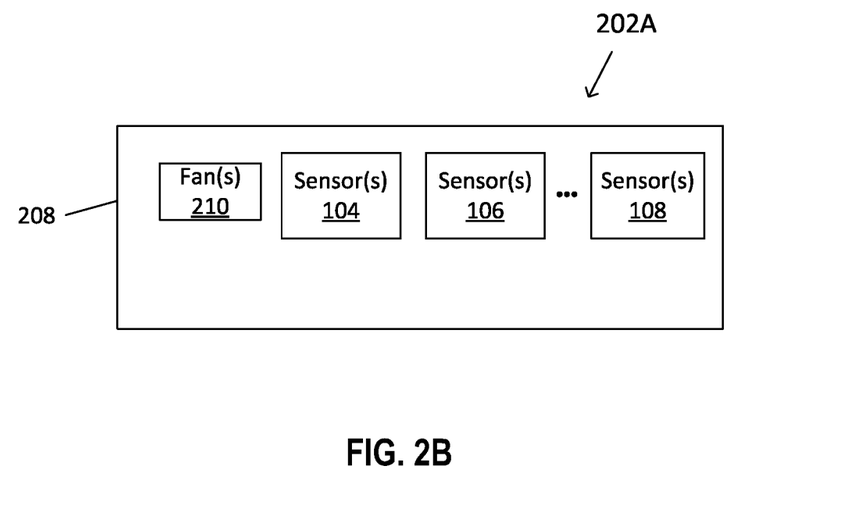
FIG. 2B shows an example sensor platform of FIG. 2A including sensors and fans in a box, in accordance with some aspects of the disclosure.

FIG. 2B shows example components in an example sensor platform 202A. including example electrical components housed in a box (e.g., chassis, assembly, container/housing, etc.), in accordance with some aspects of the disclosure. In this example, the sensor platform 202A includes a box 210 housing one or more fans 210 and sensors 104, 106, and 108. The one or more fans 210 can provide and/or circulate air in the box 210 to cool the sensors 104, 106, and 108 (and any other components in the sensor platform 202A) and/or help manage thermal conditions inside the box 210.

The sensors 104, 106, 108 can include, for example and without limitation, one or more image sensors, humidity sensors, temperature sensors, pressure sensors, radars, LIDARs, IMUs, audio sensors, depth sensors, and/or any other suitable sensor. In some examples, the box 210 can house other components such as, for example, memory, a storage device, a processor, heat exchangers, etc.

The components shown in FIG. 2B are merely non-limiting example components that can be included in a sensor platform (e.g., sensor platform 202A, sensor platform 202B, sensor platform 202C, sensor platform 202D). Other examples can include more or less components than shown in FIG. 2B.

The sensor platforms are also referred to herein as pods or module units. In some examples, the sensor platforms can be configured as self-contained modules or pods, which can be easily removed, replaced, adjusted, etc. In some examples, the sensor platforms can protect the components (e.g., sensors, etc.) in the sensor platforms from damage by external factors and/or forces, such as weather, projectiles, impacts, etc.

Figure 3:
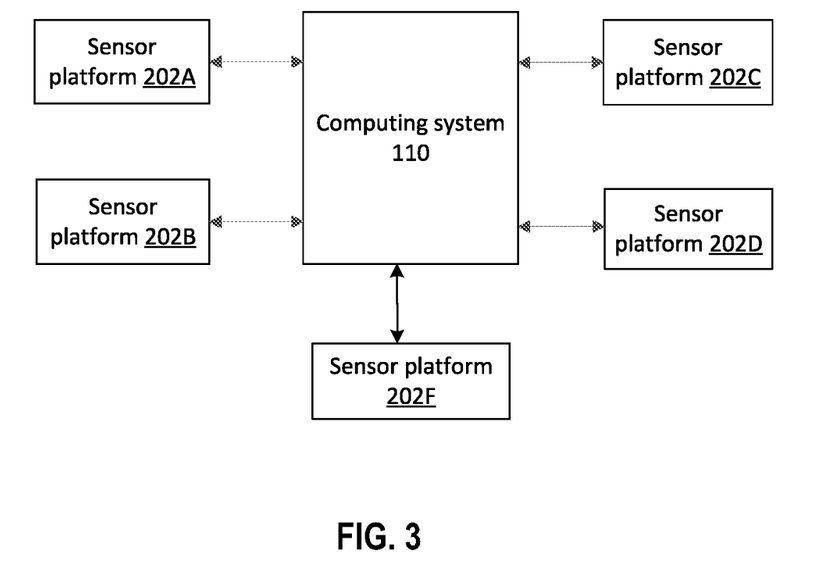
FIG. 3 is a diagram of an example computing system controlling fans and sensors in example sensor platforms, in accordance with some aspects of the disclosure.

FIG. 3 is a diagram of a computing system controlling components (e.g., fans, sensors, etc.) in the sensor platforms 202A-F, in accordance with some aspects of the disclosure. The autonomous vehicle 102 may include a computing system 110 for controlling the sensors (and any other components) in each sensor platform and collecting data from the sensors (and any other components). As shown, the computing system 110 can communicate with the components (e.g., fan 210, sensor 104, sensor 106, sensor 108, and/or any other components) in each of the sensor platforms 202A-F to control a state and/or operation of each component, obtain data from each component (e.g., sensor data, etc.), provide thermal management (e.g., activate/manage components for reducing/dissipating heat, etc.), etc. For example, the computing system 110 may control how fast the fans run and how long the fans run. The computing system 110 may also determine when the fans (and/or any other thermal management components in the sensor platforms 202A-F) would not be sufficient to keep the components cool to prevent a thermal overheating event and/or a shutdown of the autonomous vehicle caused by a thermal overheating event.

The computing system 110 may collect data from components in the sensor platforms 202A-F such as, for example, temperature readings within the sensor platforms 202A-F, power outputs of components in the sensor platforms 202A-F, humidity measurements, operating conditions/states, sensor readings, etc.

The computing system 110 can generate temperature and thermal management information, such as temperature information, overheating predictions/warnings, information for reducing a temperature of components and/or avoiding a thermal overheating event, etc. For example, the computing system 110 may generate a warning if the temperature or thermal loading of the sensors or electronic components in any of the sensor platforms exceeds a threshold. In some examples, the computing system 110 can generate a suggestion/instruction to park the autonomous vehicle to avoid an overheating event if the temperature or thermal loading of the sensors or electronic components exceeds a threshold. In some cases, the suggestion/instruction can include an indication of an estimated amount of time and/or traveling distance before a thermal event occurs. This information can help identify an urgency of the potential thermal event, which can help determine a response, such as selecting where to park, how amount time spend searching for a place to park, how much distance to travel in search of a place to park, etc.

The computing system 110 has access to routing data from a routing subsystem in the autonomous vehicle. The computing system 110 also has access to other data such as, for example, weather data, operating conditions, statistical data, processing parameters, preferences, etc. The computing system 110 can provide any of such information as inputs to a thermal model, as further described herein.

Figure 4:
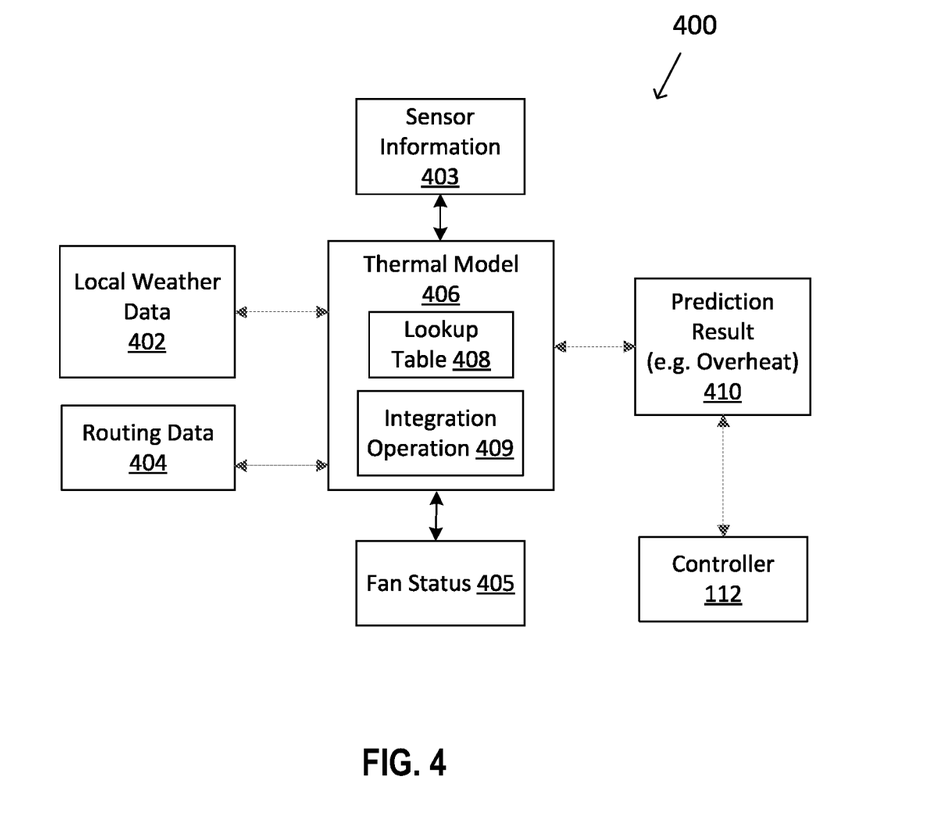
FIG. 4 is a block diagram illustrating example inputs to a thermal model, in accordance with some aspects of the disclosure.

FIG. 4 is a block diagram illustrating example inputs 400 to a thermal model, in accordance with some aspects of the disclosure. In this example, routing data 402 and local weather data 404 are input to a thermal model 406. The routing data 402 and local weather data 404 are merely one illustrative example of inputs to the thermal model 406. In other examples, the inputs to the thermal model 406 can include other data such as, for example, operating conditions data, feedback data, humidity data, temperature data, other sensor data, and/or any other data.

In some cases, a certain amount of routing data 404 may come from one or more external sources (e.g., a server, the Internet, etc.). In some cases, some or all of the routing data 404 can be obtained/generated via the internal computer on the vehicle. For example, in some cases, some or all of the routing data 404 with respect to how to get from point A to point B is generated on the vehicle by the on-board computer of the vehicle. In some cases, the weather data 402 may be obtained/generated via one or more sensors on the vehicle and/or received via wireless data such as, for example, cellular data.

The inputs 400 may also include sensor information 403 onboard the sensors, such as cameras or LiDARs. The sensor information 403 may include a sensor temperature(s), information about when a sensor would be on/off or if the sensor is in a heavy use, a state or operation of one or more sensors, sensor data, and/or other sensor information. In some cases, one or more of the sensors on the vehicle may only be used in certain scenarios. For example, some sensors may only be used for unprotected turns. If a sensor is on, it would add more head to the pod/platform than if it is off. The inputs 400 may also include fan tachometer or fan status 405, which indicates information about a fan such as whether a fan is broken or operational, as an example.

The thermal model 406 may include a lookup table system 408 that includes various lookup tables for sensors or components of the sensor platforms. The thermal model 406 may also include an integration operation 409 for predicting thermal conditions/states (e.g., temperatures, etc.) of the sensor platforms (and/or components in the sensor platforms) and/or associated overheating events. In some examples, the thermal model 406 can predict thermal conditions/states, such as temperatures, over time (e.g., at one or more future times) and/or along a routing path. In some examples, the thermal model 406 can implement an artificial intelligence (AI) or machine learning (ML) algorithm(s) for predicting thermal conditions/states such as, for example, temperatures, overheating events, etc. For example, in some cases, the thermal model 406 can implement a neural network(s) configured to generate predictions of thermal events/conditions based on input data such as, for example, the local weather data 402, the routing data 404, and any other data (e.g., other sensor data, state data, operational data, environment information, etc.).

The thermal model 406 can use the integration operation 409 to predict the temperature ups and downs. The temperature change is cumulative along the routing path. In other words, the effect of thermal heating and cooling on the temperature change is an integration of power over time along the routing path. For each section of the routing path, the temperature may increase or decrease. For example, assume the autonomous vehicle drives at 35 miles per hour for three minutes and then drives at 25 miles per hour for another two minutes, and then stops at a stop light for 1 minute. The temperature change with time is an integration effect of the thermal heating and cooling along this routing path.

The thermal model 406 outputs to a prediction result 410 that includes a prediction of the possible overheating of the sensors or components of the sensor platforms, such as thermal loading power or temperatures of the sensors or components of the sensor platforms. In some examples, the prediction result 410 may be connected to the control service 112 or controller that can instruct the autonomous vehicle to park to prevent a shutdown and/or overheating event based on prediction information from the prediction result 410. In some examples, the prediction result 410 can provide timing and/or distance information to the control service 112 to inform the control service 112 of an amount of time and/or traveling distance before an overheating event, which the control service 112 can use when determining where and/or when to instruct the autonomous vehicle to park.

The routing data 402 and weather data 404 may affect the temperature and/or thermal management (e.g., cooling, etc.) of the sensor platforms. For example, in a hot sunny day, when the autonomous vehicle 102 stops at a red light, the fans in the sensor platforms of the autonomous vehicle may not be able to keep the sensor platforms and/or components therein cool, and eventually after a certain amount of time at this red light, the sensors or components in the sensor platforms may heat up to a threshold temperature at which an overheating event may occur and/or the autonomous vehicle may shutdown. Thus, the temperature in the environment, the operating state of the autonomous vehicle and/or components thereof, the routing of the autonomous vehicle, etc., can affect the temperature of the sensor platforms (and components thereof) and increase or decrease the likelihood of an overheating event.

The routing data 402 may include where the autonomous vehicle is heading, a starting point and a destination point, possible paths from the starting point to the destination point, a remaining distance of travel to a destination, an estimated travel time, information about a routing path (e.g., traffic information, speed limits, stop signs/lights, estimated traveling speeds, road conditions, etc.), etc. The routing data 402 can provide the autonomous vehicle information about its location, when to perform a maneuver (e.g., take the next turn, stop at a traffic sign (e.g., light, stop sign, etc.), exit a road, etc.), when to reach an intersection, whether the intersection has a stoplight or not, etc. The routing data 402 can provide the autonomous vehicle information about speed limits, traffic, road conditions, etc. In some examples, the routing data may include GPS coordinates and a selected path, which may route the autonomous vehicle to drive in a certain direction for a certain distance, perform any maneuvers, reach a destination, etc. The path may vary due to certain factors such as, for example, road construction, traffic, etc.

In some examples, when the autonomous vehicle is driving, the motion of the air helps keep the sensor platforms cool. When the autonomous vehicle is driving at a higher speed, air can often blow faster (e.g., absent obstructions) over the sensor platforms, which creates a convective cooling effect. On the highway, the speed limit is relatively higher such that the autonomous vehicle drives relatively faster, which helps with cooling the sensor platforms. When there is a stop light, the components of the sensor platforms may be overheated because the convective cooling is significantly reduced when the autonomous vehicle is stopped at a red light. The temperature inside the sensor platforms may rise to above a temperature threshold.

The local weather data 404 may include temperature, wind, humidity, sunshine conditions (e.g. sunny, cloudy or rainy), among others, which can affect the temperature and cooling of components in the autonomous vehicle. The environment temperature can vary at different locations, times, seasons, etc., which can have different impacts on the temperature and thermal management of components in the autonomous vehicle.

In some examples, the local weather data 404 may be transmitted to the autonomous vehicle, such as through wireless communication (e.g., cellular (e.g., LTE, 5G, etc.) or any other wireless technologies. In some examples, the local weather data 404 may be collected through sensors in a subsystem on the autonomous vehicle. In some examples, the local weather data 404 may be obtained using a combination of data transmission and collection from sensors.

As previously noted, the computing system 110 has access to additional information including weather data (e.g. air temperature outside the vehicle, wind speed, sunny, cloudy, or rainy) and routing data from a routing subsystem in the autonomous vehicle. The computing system 110 can predict overheating in real time based upon the thermal model. In some cases, the thermal model 406 uses the autonomous vehicle's routing data (e.g., traffic signs, road conditions, traveling parameters, destination information, routes, traffic, etc.), local weather conditions, and/or any other data (e.g., sensor data, operating conditions, etc.) to predict when one or more components of the autonomous vehicle would overheat, such as sensors and/or other electrical components in the sensor platforms 202A-F.

The thermal model 406 may consider the heat or thermal load generated by each electronic component and sensor in the sensor platforms, in predicting overheating events. The thermal model 406 can use power consumption data for the sensors in the sensor platforms, in predicting overheating events. For example, sensor 104 may generate a first amount of heat, e.g. 15 watts of heat on average when running in full power, and sensor 106 may generate a second amount of heat, e.g. 10 watts of heat. The thermal model 406 can use such information in predicting an overheating event for sensor 104, sensor 106, and/or other components that may be impacted by the heat generated by sensor 104 and/or sensor 106

The thermal model 406 may also include the thermal heating from sun radiation, which may vary depending upon a sunny day, as a factor in predicting thermal events. In some examples, the thermal model 406 can also consider the direction of the sunlight as a factor for predicting thermal events. For example, the sun radiation may be the strongest at noon time. The thermal model 406 can consider the sun radiation and its effects on the temperature of components when predicting thermal events.

The thermal model 406 may also consider air blowing through the sensor platform at a certain rate based on the fan speed, the vehicle speed, internal volumes of the sensor platforms, masses of the sensor platforms, thermal properties of the sensor platforms, etc.

The thermal model 406 may include a convective cooling from blowing outside air through the sensor platforms by using the fans at certain air temperature outside the autonomous vehicle, which affects the cooling power of the sensor platforms. The thermal model can also include convective heating losses from air blowing past the sensor platforms that move at a certain speed, e.g. 35 miles per hour.

By using the routing data 402 and local weather data 404 (e.g., outside air temperature), as well as any other data as described herein, the thermal model 406 can predict thermal cooling for the sensor platforms. For example, the thermal model 406 can determine how effective the fans would be for cooling the components inside the sensor platforms, which is affected by the convection cooling from the autonomous vehicle's driving speed and also the convection cooling from the wind passing around the sensor platforms. The thermal model 406 can use the effectiveness of the fans in predicting thermal events.

The thermal cooling may also vary with the outside air temperature and humidity.

The thermal model 406 may use lookup tables 408 for each sensor platform, which may include thermal cooling power corresponding to one or more speeds of the autonomous vehicle in one or more environment conditions, for example, air temperature outside the autonomous vehicle, humidity, sunny, cloudy, or rainy, wind, humidity, among others. The lookup tables 408 may be generated based on test data, conventional thermal modeling such as finite element analysis (FEA) package, and/or other data. When the autonomous vehicle drives at a certain speed (e.g., 35 miles per hour), the cooling power is relatively high. For example, a thermal loading of 15 watts may be expected for the sensor platforms when the autonomous vehicle travels at a certain speed. The cooling power increases with the speed of the autonomous vehicle.

The lookup tables 408 may also include thermal heating power at various initial conditions for the sensors in the sensor platforms. The initial conditions may affect the thermal heating power. For example, when the radar sensor runs at a full power, the radar sensor may produce a higher thermal loading power than when the radar sensor is off. When the radar sensor is at the full power, the thermal loading power from the radar may be, in a non-limiting example, about 50 watts. When the radar sensor is off, the thermal loading power may be, in a non-limiting example, about 2 watts. By evaluating all the initial conditions, the lookup tables 408 may include ranges of thermal heating power and thermal cooling power for each sensor or each electronic component of each sensor platform.

The thermal model 406 can use the integration operation 409 to predict the temperature ups and downs. The temperature change is cumulative along the routing path. In other words, the effect of thermal heating and cooling on the temperature change is an integration of power over time along the routing path. For each section of the routing path, the temperature may increase or decrease.

As an example, by using the lookup tables 408, a thermal heating power of 80 watts and a thermal cooling power of 70 watts may be expected for a sensor platform. In the thermal model 406, the thermal heating power is subtracted by the thermal cooling power to produce a thermal loading power for each sensor platform along the routing path. The thermal loading power is multiplied by a time to obtain an integration effect on temperature over time. The temperature inside the sensor platform may go up and down over time. The thermal model can predict the temperature may rise at a rate determined by the thermal mass and the volume of the sensor platform and the thermal loading difference (e.g. 10 watts) between the thermal heating and the thermal cooling.

The thermal model 406 can predict if the sensor platforms would be overheated. In some examples, the computing system 110 can give a warning for possible overheating, and can arrange the autonomous vehicle 102 to be pulled over to the side road or somewhere. For example, the thermal model 406 can determine the possible overheating of components in the sensor platform at a threshold time period in advance before the autonomous vehicle gets to a stop light. If there is a reasonable chance that the autonomous vehicle may become too hot at the threshold time period, the computing system 110 can provide a warning to the control service 112 or controller for the autonomous vehicle to be pulled over to park. This can avoid shutdown of the autonomous vehicle in the middle of the road. Instead, the autonomous vehicle can be parked before a shutdown occurs.

The prediction in real time allows the autonomous vehicle to find a place for the autonomous vehicle to pull over and park. The autonomous vehicle would be out of traffic and passengers in the autonomous vehicle can be safely let out of the vehicle. Then, the passengers may either make other arrangements or a backup vehicle can be sent over. By using the prediction from the thermal model 406, the autonomous vehicle can avoid certain situations, such as traffic jams, inconveniences, damage to components, delays, and/or other problems.

It will be appreciated by those skilled in the art that the thermal model 406 may be applied to not only the sensor platforms (and components thereof), but also other components in the autonomous vehicle. For example, the thermal model may apply to a server in the autonomous vehicle, among others.

Figure 5:
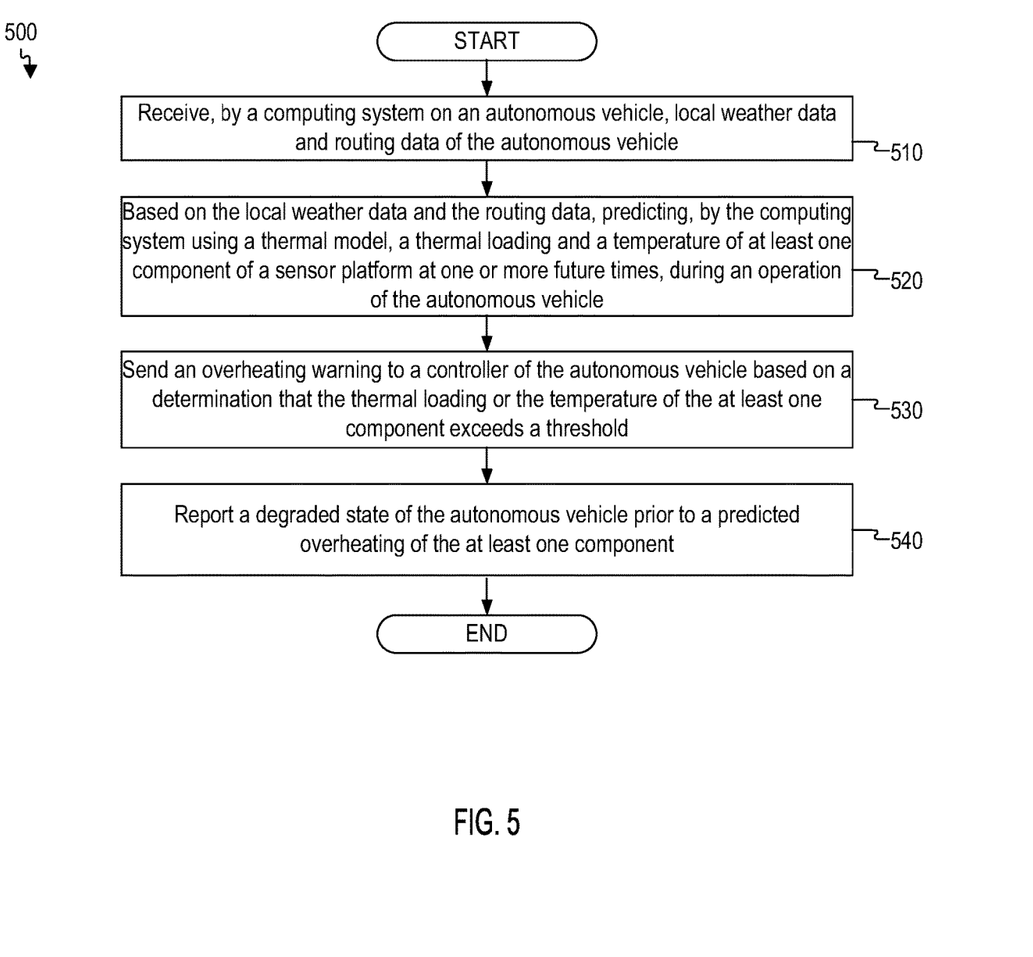
FIG. 5 is a flowchart illustrating an example process for reporting a degraded state of an autonomous vehicle based on a thermal model, in accordance with some aspects of the disclosure.

FIG. 5 is a flowchart illustrating an example process 500 for controlling an autonomous vehicle (e.g., autonomous vehicle 102) based on information from a thermal model (e.g., thermal model 406). For example, the process 500 can be used to trigger the autonomous vehicle to perform an action (e.g., stop, park, slow down, use a different path with one or more conditions that can impact a thermal management of components, etc.) based on a thermal event and/or temperature prediction from the thermal model. Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

According to some examples, at block 510, the process 500 may include receiving, by a computing system (e.g., computing system 110) on an autonomous vehicle, local weather data and routing data of the autonomous vehicle. The autonomous vehicle can include one or more sensor platforms (e.g., sensor platform 202A, sensor platform 202B, sensor platform 202C, sensor platform 202D, sensor platform 202F) mounted on the autonomous vehicle. For example, the computing system illustrated in FIG. 3 may receive local weather data and routing data of the autonomous vehicle.

According to some examples, at block 520, the process 500 may include predicting, using a thermal model (e.g., thermal model 406) and based on the local weather data and the routing data, a thermal loading and a temperature of at least one component (e.g., sensor 104, sensor 106, sensor 108) of the sensor platform at one or more future times. In some examples, the thermal model can predict the thermal loading and the temperature during an operation of the autonomous vehicle (e.g., while the autonomous vehicle is driving, while the autonomous vehicle is running but stopped, etc.). For example, the thermal mode 406 illustrated in FIG. 4 may predict a thermal loading and a temperature of at least one component of the sensor platform at a time in the future based on the local weather data and the routing data, while the autonomous vehicle is driving.

According to some examples, at block 530, the process 500 may include sending an overheating warning from the computing system to a controller of the autonomous vehicle based on a determination that the predicted thermal loading or the temperature of the at least one component exceeds a threshold. For example, the computing system illustrated in FIG. 3 may send an overheating warning to a controller of the autonomous vehicle based on a determination that the predicted thermal loading or the temperature of the at least one component exceeds a threshold or is estimated to exceed a threshold during an operation of the autonomous vehicle.

In some examples, the threshold may include a certain thermal loading and/or temperature that is within a certain amount/distance to a thermal loading and temperature determined to cause overheating. The threshold mat vary based on certain conditions (e.g., weather, driving speed/time/distance, environment conditions, etc.). For example, the threshold when the autonomous vehicle is driving in Alaska in the winter may be different than the threshold when the autonomous vehicle is driving in a hot summer day in Arizona. The threshold may vary when the autonomous vehicle is driving fast on the highway versus driving slowly in a busy NYC road.

According to some examples, at block 540, the process 500 may include reporting a degraded state of the autonomous vehicle. For example, the controller illustrated in FIG. 1 may report a degraded state of the autonomous vehicle before the at least one component overheats and/or a potential shutdown of the autonomous vehicle caused by overheating of the at least one component.

The degraded state of the vehicle may be at various levels. The degraded state may result in an operation that constrains the operational domain of the vehicle to mitigate detected risks. Depending upon the level of the degraded state, the vehicle may look for the nearest place to pull over at higher levels of degraded states, but may continue to navigate at lower levels of degraded state.

According to some examples, the process 500 may also include directing the autonomous vehicle to park prior to a predicted overheating of the at least one component. For example, the controller illustrated in FIG. 1 may direct the autonomous vehicle to park before the at least one component overheats and/or a potential shutdown of the autonomous vehicle caused by overheating of the at least one component.

In some examples, predicting the thermal loading and the temperature may include determining, via the thermal model and based on the local weather data and routing data, one or more changes in the thermal loading and the temperature associated with the at least one component or the sensor platform over time.

In some examples, the predicting of the thermal loading and the temperature is further based on one or more lookup tables that comprise at least one of thermal heating power and thermal cooling power at one or more speeds of the autonomous vehicle and environment temperatures outside the autonomous vehicle.

In some examples, the at least one component comprises one or more of a radar sensor, a LiDAR sensor, a camera sensor, a depth sensor, and an inertial measurement unit.

In some examples, the sensor platform comprises at least one a fan or blower.

In some examples, the thermal loading is the difference between a thermal heating power and a thermal cooling.

In some examples, the thermal heating is caused by the at least one component and one or more conditions associated with a local weather.

In some examples, the thermal cooling is caused by at least one a fan or blower in the sensor platform, a local weather, and a driving operation of the autonomous vehicle.

In some examples, the routing data indicates a time that the autonomous vehicle is predicted to stop at an intersection of roads or a traffic sign.

In some examples, the local weather data comprises at least one of an environment temperature, a sun condition, wind information, and humidity.

In some examples, directing the autonomous vehicle to park comprises directing the autonomous vehicle to park for at least a threshold period of time prior to the overheating of the at least one component. The vehicle may remain parked until temperatures reduce below a set threshold. The vehicle may also remain parked until the thermal prediction result improves, particularly for a new route to a maintenance or storage facility. The vehicle may remain parked until a human staff comes to inspect and/or retrieve the vehicle. The vehicle may remain parked until a remote human operator overrides the parking.

In some examples, the thermal model 406 may take the local weather data and routing data as input and determines changes in the thermal loading and temperature associated with the at least one component over time.

In some examples, the prediction uses one or more lookup tables that comprise thermal heating power and thermal cooling power at one or more speeds of the autonomous vehicle and environment temperatures outside the autonomous vehicle.

In some examples, the autonomous vehicle is directed to park for at least a threshold period of time prior to the overheating of the at least one component.

Figure 6:
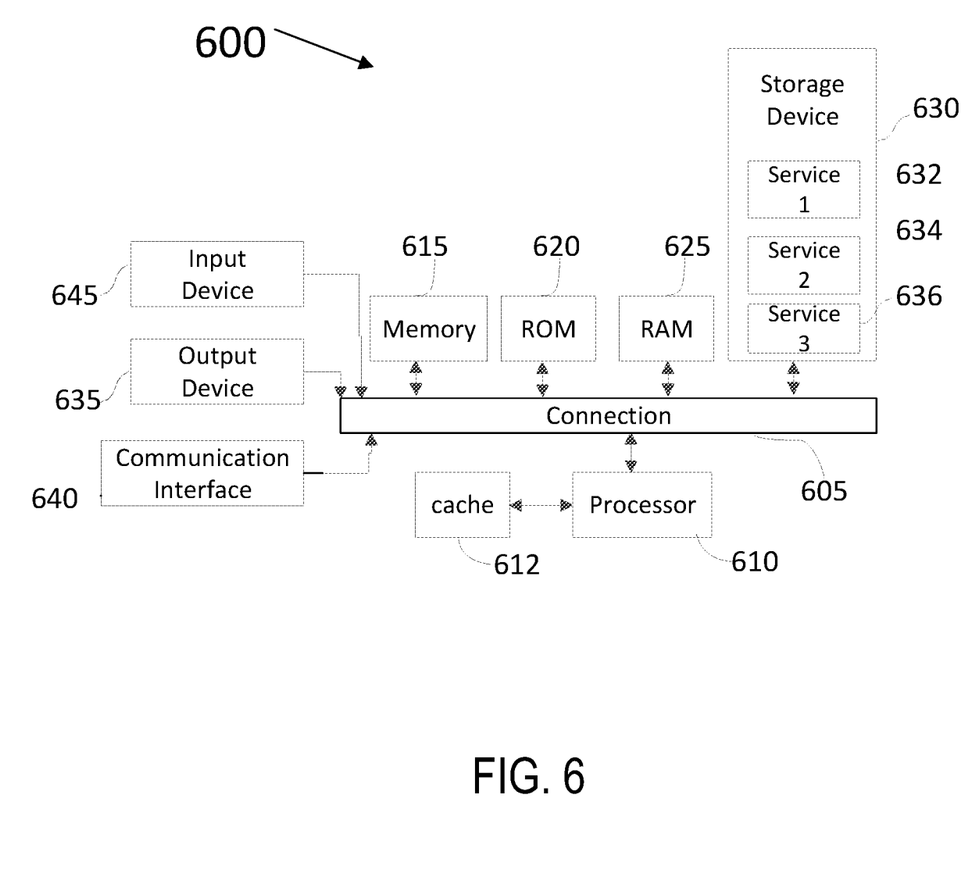
FIG. 6 illustrates an example processor-based system for implementing certain aspects of the disclosure.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory autonomous vehicles, solid state memory devices, digital versatile disks, autonomous vehicles, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to autonomous vehicle out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising:
   receiving, by a computing system on an autonomous vehicle, local weather data and routing data of the autonomous vehicle, the autonomous vehicle comprising a sensor platform mounted on the autonomous vehicle, wherein the routing data includes a planned route for the autonomous vehicle to navigate;
   based on the local weather data and the routing data, predicting, by the computing system using a thermal model and based on one or more lookup tables, a thermal loading and a temperature of at least one component of the sensor platform at one or more future times during an operation of the autonomous vehicle, wherein the one or more lookup tables include, for components of the sensor platform, at least one of thermal heating power and thermal cooling power corresponding to one or more speeds of the autonomous vehicle in one or more environment conditions outside the autonomous vehicle;
   sending an overheating warning to a controller of the autonomous vehicle based on a determination that the thermal loading or the temperature of the at least one component exceeds a threshold, wherein the overheating warning includes an estimated amount of time before a predicted overheating of the at least one component of the sensor platform occurs; and
   adjusting the operation of the autonomous vehicle to adjust the planned route of the autonomous vehicle based on the overheating warning prior to the predicted overheating of the at least one component of the sensor platform.

2. The computer-implemented method of claim 1, wherein predicting the thermal loading and the temperature comprises determining, via the thermal model and based on the local weather data and routing data, one or more changes in the thermal loading and the temperature associated with the at least one component of the sensor platform over time.

3. The computer-implemented method of claim 1, wherein the at least one component comprises one or more of a radar sensor, a LiDAR sensor, a camera sensor, a depth sensor, and an inertial measurement unit.

4. The computer-implemented method of claim 1, wherein the sensor platform comprises at least one fan or blower.

5. The computer-implemented method of claim 1, wherein the thermal loading comprises a thermal heating caused by the at least one component or one or more conditions associated with a local weather.

6. The computer-implemented method of claim 1, wherein the thermal loading comprises a thermal cooling caused by at least one fan or blower in the sensor platform, a local weather, and a driving operation of the autonomous vehicle.

7. The computer-implemented method of claim 1, wherein the routing data indicates a time that the autonomous vehicle is predicted to stop at an intersection of roads or a traffic sign.

8. The computer-implemented method of claim 1, wherein the local weather data comprises at least one of an environment temperature, a sun condition, wind information, and humidity.

9. The computer-implemented method of claim 1, further comprising:
   directing the autonomous vehicle to park, wherein directing the autonomous vehicle to park comprises directing the autonomous vehicle to park for at least a threshold period of time prior to the predicted overheating of the at least one component.

10. A system for an autonomous vehicle, comprising:
    one or more processors; and
    at least one computer-readable storage medium having stored therein instructions which, when executed by the one or more processors, cause the system to:
    receive, by a computing system on an autonomous vehicle, local weather data and routing data of the autonomous vehicle, the autonomous vehicle comprising a sensor platform mounted on the autonomous vehicle, wherein the routing data includes a planned route for the autonomous vehicle to navigate;

based on the local weather data and the routing data, predict, by the computing system using a thermal model and based on one or more lookup tables, a thermal loading and a temperature of at least one component of the sensor platform at one or more future times during an operation of the autonomous vehicle, wherein the one or more lookup tables include, for components of the sensor platform, at least one of thermal heating power and thermal cooling power corresponding to one or more speeds of the autonomous vehicle in one or more environment conditions outside the autonomous vehicle;

send an overheating warning to a controller of the autonomous vehicle based on a determination that the thermal loading or the temperature of the at least one component exceeds a threshold, wherein the overheating warning includes an estimated amount of time before a predicted overheating of the at least one component of the sensor platform occurs; and adjust the operation of the autonomous vehicle to adjust the planned route of the autonomous vehicle based on the overheating warning prior to the predicted overheating of the at least one component of the sensor platform.

11. The system of claim 10, wherein the thermal model takes the local weather data and routing data as input and determines changes in the thermal loading and the temperature associated with the at least one component of the sensor platform over time.

12. The system of claim 10, wherein the at least one component comprises one or more of a radar sensor, a LiDAR sensor, a camera sensor, a depth sensor, and an inertial measurement unit, wherein the sensor platform comprises at least one fan or blower.

13. The system of claim 10, wherein the thermal loading comprises a thermal heating caused by the at least one component and one or more conditions associated with a local weather.

14. The system of claim 10, wherein the thermal loading comprises a thermal cooling caused by at least one fan or blower in the sensor platform, a local weather, and a driving operation of the autonomous vehicle.

15. The system of claim 10, wherein the local weather data comprises at least one of an environment temperature, a sun condition, wind information, and humidity.

16. The system of claim 10, wherein the autonomous vehicle is directed to park for at least a threshold period of time prior to the predicted overheating of the at least one component.

17. A non-transitory computer readable medium comprising instructions, the instructions, when executed by a computing system on an autonomous vehicle, cause the computing system to:

receive, by a computing system on an autonomous vehicle, local weather data and routing data of the autonomous vehicle, the autonomous vehicle comprising a sensor platform mounted on the autonomous vehicle, wherein the routing data includes a planned route for the autonomous vehicle to navigate;

based on the local weather data and the routing data, predict, by the computing system using a thermal model and based on one or more lookup tables, a thermal loading and a temperature of at least one component of the sensor platform at one or more future times during an operation of the autonomous vehicle, wherein the one or more lookup tables include, for components of the sensor platform, at least one of thermal heating power and thermal cooling power corresponding to one or more speeds of the autonomous vehicle in one or more environment conditions outside the autonomous vehicle;

send an overheating warning to a controller of the autonomous vehicle based on a determination that the thermal loading or the temperature of the at least one component exceeds a threshold, wherein the overheating warning includes an estimated amount of time before a predicted overheating of the at least one component of the sensor platform occurs; and adjust the operation of the autonomous vehicle to adjust the planned route of the autonomous vehicle based on the overheating warning prior to the predicted overheating of the at least one component of the sensor platform.

18. The non-transitory computer readable medium of claim 17, wherein the thermal model takes the local weather data and routing data as input and determines changes in the thermal loading and the temperature associated with the at least one component of the sensor platform over time.

19. The computer-implemented method of claim 1, wherein adjusting the operation of the autonomous vehicle to adjust the planned route of the autonomous vehicle includes determining at least one of a place or a timing to park the autonomous vehicle.

20. The system for the autonomous vehicle of claim 10, wherein adjusting the operation of the autonomous vehicle to adjust the planned route of the autonomous vehicle includes determining at least one of a place or a timing to park the autonomous vehicle.

* * * * *